May 21, 1963 E. L. VALENTINE 3,090,393
METHOD AND APPARATUS FOR CLEANING TANKS
Filed July 6, 1959 2 Sheets-Sheet 1

INVENTOR.
EDWARD L. VALENTINE.
BY
ATTORNEYS

May 21, 1963
E. L. VALENTINE
3,090,393
METHOD AND APPARATUS FOR CLEANING TANKS
Filed July 6, 1959
2 Sheets-Sheet 2
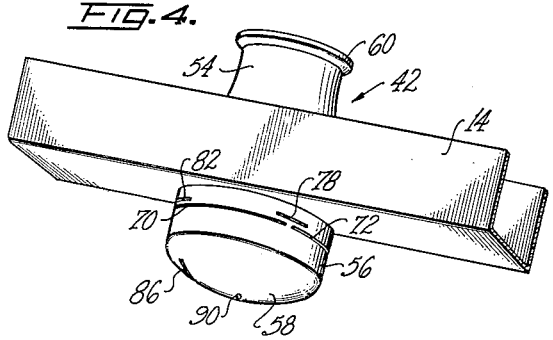
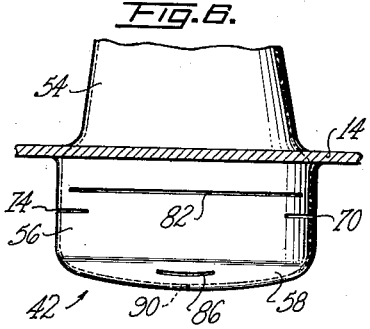
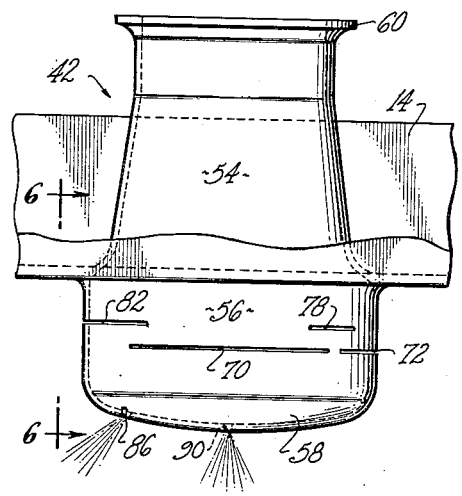
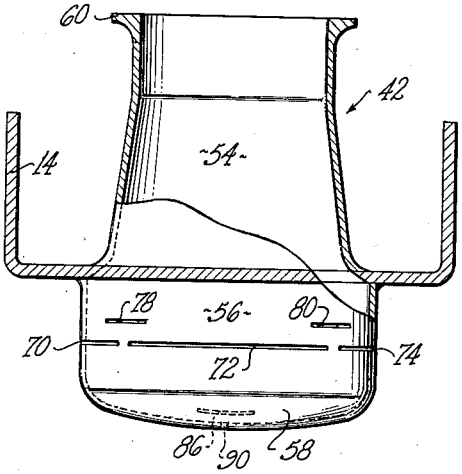
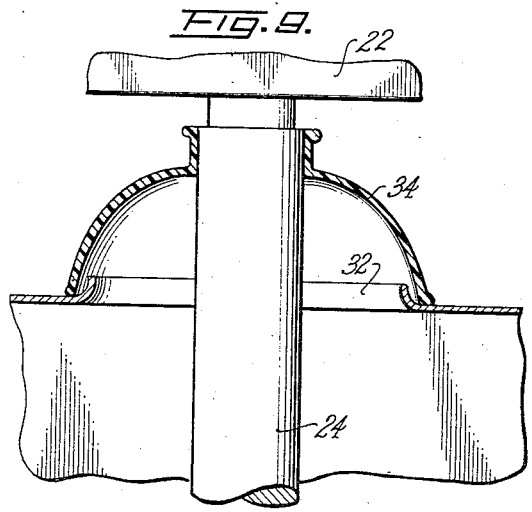
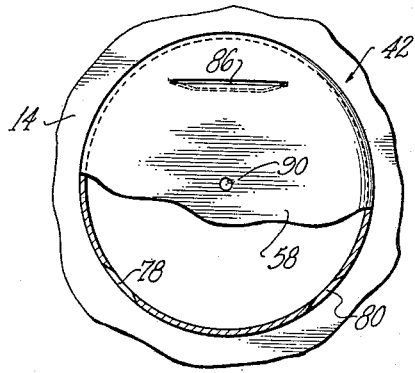
INVENTOR.
EDWARD L. VALENTINE
BY
ATTORNEYS

United States Patent Office 3,090,393
Patented May 21, 1963

3,090,393
METHOD AND APPARATUS FOR CLEANING TANKS
Edward L. Valentine, 9335 E. Friendship Ave., Pico-Rivera, Calif.
Filed July 6, 1959, Ser. No. 825,303
9 Claims. (Cl. 134—169)

The present invention relates generally to the cleaning of tanks, and more particularly to the cleaning of milk storage tanks.

Fluid milk is probably the most easily contaminated food, and this is particularly true of raw milk in which bacteria will grow very rapidly as compared to pasteurized milk. Therefore elaborate precautions must be taken to protect the milk from contamination by the equipment in which it is stored and I have developed an improved method and cleaning apparatus to maintain milk storage tanks in an absolutely sanitary condition.

Milk storage tanks are not always filled to the same level and each time the tank is drained a new line of residual milk solids may be left on the wall of the tank indicating the level to which the tank was filled. Thus, after repeated filling and draining of the tank a number of level lines and even layers of residual film will be left on the wall of the tank, even though attempts have been made to clean the tank by conventional methods.

Conventionally, milk storage tanks may be cleaned manually by a worker who enters the tank with a pail of suitable detergent and a stiff brush and scours the interior walls of the tank. This procedure usually results in scarring the surface of the tank wall, destroying the mirror finish of the stainless steel and creating pockets for entrapping portions of the residual film of milk. This method is unsatisfactory since it does not remove the milk-level lines and in older tanks a great many such level lines will remain on the tank wall even after repeated scourings.

Another conventional method for cleaning the interior of milk tanks utilizes stationary spray heads, usually mounted in the upper surface of the tank, and formed with a plurality of circular orifices through which jets of a cleaning solution are sprayed. These circular perforations are uniformly spaced apart and in operation deliver forceful jets of cleaning solution which maintain a circular cross-sectional configuration until they impinge on the walls of the tank. With this apparatus those portions of the tank walls against which the jets directly impinge will be cleaned, but the surrounding areas not directly impinged by a jet of cleaning solution will build up a residue of milk film and the milk-level lines are scarcely affected by the circular jets. It will be appreciated that although the circular jets may be closely spaced together on the spray head, when the jets of solution radiate outwardly from the spray head they impinge at widely spaced-apart points on the tank wall.

My invention provides a method and apparatus for maintaining the entire area of the interior of a milk tank in a completely spotless condition in which no residual milk film can remain and all milk-level lines are obliterated or eliminated. With the method of my invention the cleaning solution is presented to the inner surfaces of the tank in the form of a broad, continuous and unbroken film which circulates over all interior surfaces of the tank. The cleaning solution is continuously drained from the tank and recirculated by a pumping means which is adapted to reintroduce the recycled solution into the upper portion of the tank.

An object of my invention is to provide a storage tank for milk, and particularly raw milk immediately after the milk is taken from the cow, and including an improved spray cleaning apparatus for cleaning the interior of the tank after the milk has been withdrawn therefrom.

Another object of my invention is to provide a method of cleaning a milk storage tank by spraying a detergent or other cleaning solution thereinto in order to remove a residual film of fluid milk left within the tank by the fluid milk previously stored therein.

It is also an object of the invention to provide a spraying apparatus for a milk tank with a spray head having a plurality of detergent-discharging apertures each of which is oriented in a predetermined manner with reference to a particular portion of the tank to be cleaned.

Yet another object of the invention is the provision of an improved spray head for a tank-cleaning apparatus, the spray head being equipped with a plurality of orifices adapted to disperse a detergent or other cleaning solution in the form of broad films of detergent impinging on the inner surfaces of the tank, and the plurality of apertures additionally being adapted for creating overlapping streams whereby the entire inner surface of the tank is subjected to a cleaning action.

The invention also has for an object thereof the provision of a milk-tank cleaning apparatus having a spray head adapted to subject all portions of the inner surface of the tank to a substantially uniform action of the detergent or other cleaning solution.

These and other objects and advantages of my invention will be apparent from the following description when taken in conjunction with the annexed drawings, in which:

FIGURE 4 is a perspective view of a portion of the tank illustrated in FIGURE 1, particularly showing the configuration of the spray head utilized in my invention;

FIGURE 5 is a partial elevational view of the spray head of FIGURE 4;

FIGURE 6 is a partial vertical sectional view taken along the line 6—6 of FIGURE 5;

FIGURE 7 is a partial vertical sectional view of the spray head of FIGURE 5 showing the appearance of the spray head when viewed from another angle;

FIGURE 8 is a fragmentary bottom plan view of the spray head with portions cut away; and FIGURE 9 is a partial vertical sectional view of the portion of the tank of FIGURE 1 mounting the agitator shaft of the tank.

Figure 1:
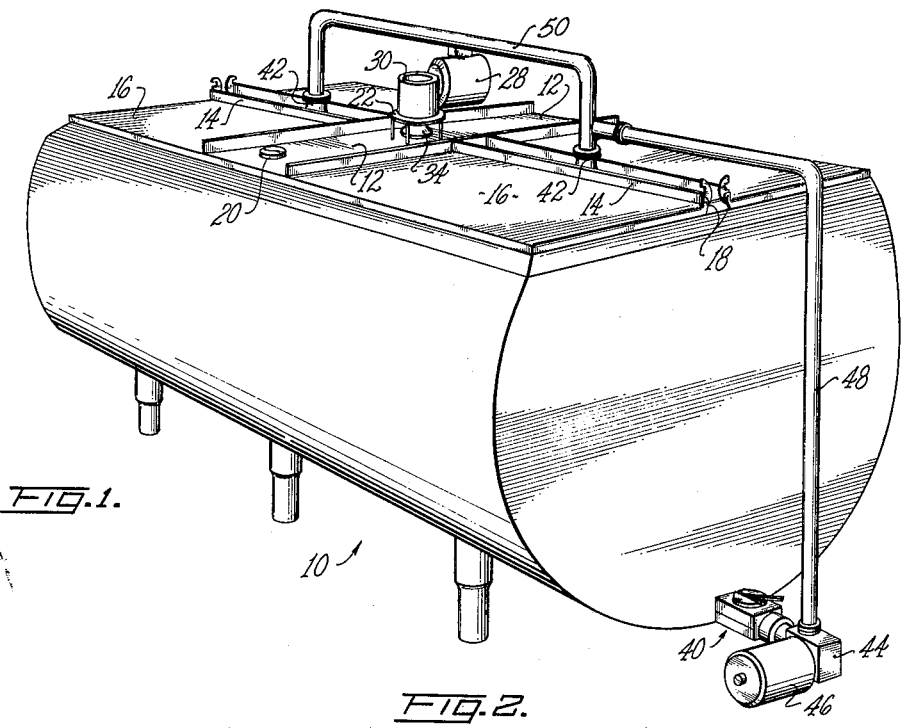
FIGURE 1 is a perspective view of a raw milk collection and storage tank embodying a presently preferred form of my tank-cleaning apparatus.

Referring now to the drawings and, in particular, to FIGURE 1, there is shown a milk collection and storage tank designated generally by the numeral 10. The top of the tank 10 includes a slightly arched transversely extending member 12 disposed centrally of the length of the tank and a pair of longitudinally extending channels 14 each of which extends slightly upwardly from one end wall of the tank to be affixed at its other end to the mid-point on one side of the member 12. Four openings are thus defined in the tank each of which is closable by a door 16 hingedly connected as indicated at 18 to one flange of a channel 14.

The illustrated tank 10 is a collection and storage tank such as is utilized on dairy farms for directly receiving milk taken from cows. Milking machines are customarily tied in to a collection line or header which, in turn, feeds the milk into the tank 10. For receiving the milk, the central member 12 of the tank at either or both ends is provided with an inlet opening 20 to which one end of the collection line can be coupled.

As is customary, the tank 10 is provided with means for agitating and blending the milk stored in the tank and the central member 12 in its center mounts a bracket 22 which journals the upper end of a vertically extending agitator shaft 24, the lower end of the shaft, in turn, mounting a sinuous agitator blade 26. The bracket 22 also mounts a motor 28 and reduction gearbox 30 for rotating the agitator blade 26. Referring now to FIGURE 9, it will be noted that the agitator shaft 24 extends through a flanged opening 32 formed in the center member 12 and the shaft mounts a cupshaped drip shield 34 having a beaded peripheral edge which seats around the flanged opening 32. To permit visual inspection thereof the shield 34 is made of a deformable plastic material.

When the raw milk is taken from the cows it is approximately at a temperature of 100° F., at which temperature the bacteria in the milk are extremely active. Since the milk may not be taken from the tank for 12 hours or more it is desirable to store it at a temperature of approximately 40° F. to reduce bacterial action, and the tank 10 has cooling means (not shown) adapted for holding milk at this temperature. Nevertheless, the fact that the milk is still in the raw state entails continued activiy of the bacteria in the milk and, as a consequence, a significant amount of bacterial activity is present in the residual film of milk left on the interior walls of the tank 10 after the tank has been emptied.

For emptying the tank 10 a valved outlet means 40 is provided in one end wall of the tank. After all of the milk has been drawn out of the tank through the valved outlet 40 a residual film of milk, including butter fat and other solids, will be found to have adhered to the inner walls of the tank. Prior to the introduction of a new load of milk into the tank 10 this residual film, and especially the milk-level line, must be removed and the inner walls of the tank left as sanitary as possible to avoid contamination of the fresh milk by bacteria contained in the residual film. For this purpose all inner surfaces of the tank 10 must be washed with a suitable cleaning solution.

The inner surfaces of the tank have an over-all configuration closely resembling the exterior over-all configuration seen in FIGURE 1. Thus, the tank interior comprises a longitudinally extending wall of generally upwardly concave configuration which defines the floor and opposite side walls of the tank. The opposite end walls of the tank are adapted to close the opposite ends of the longitudinally extending concave wall and all of these generally vertically extending walls are closed by the four doors 16 as well as the supporting structure for the doors. It will be observed from FIGURES 1 and 3 that each of these doors, while generally horizontally disposed, has a slight slope downwardly and outwardly from the center portion of the tank; i.e., the portion mounting the agitator shaft 24.

In carrying out my invention a flowing supply of cleaning solution is introduced along the entire periphery of the upper edges of the vertically extending walls to flow gravitationally downwardly thereacross, covering all of the area of the inner surfaces of the tank walls. In the particular tank 10 illustrated the supply is achieved by utilizing a pair of spray heads 42, each serving one half of the area of the tank. These spray heads deliver a continuous supply of cleaning solution onto the under sides of the closed doors 16, the solution then flowing across the under sides of the doors and thence downwardly gravitationally on the vertically extending walls. It will be understood that the tank 10 is almost never filled to such a level that any substantial amount of milk is splashed onto the under surfaces of the doors 16; nevertheless, the arrangement serves also to clean the under sides of the doors 16 and at the same time utilizes these under surfaces for delivering wide, continuous and unbroken streams of cleaning solution to the upper edges of the vertically extending walls.

The number of spray heads 42 will depend upon the size of the tank and for the illustrated tank 10, which may be assumed to be a 1000-gallon tank, two such spray heads are utilized, each of the spray heads being formed integrally with one of the channels 14. The required quantity of cleaning solution (usually 30 gallons for a 1000-gallon tank) is introduced into the tank 10 and then recirculated. The recirculating means takes the form of a suitable pump 44 hooked up to the valved outlet 40 and driven by an electric motor 46. A generally inverted L-shaped pipe 48 has one end coupled to the outlet of the pump 44 and its other end coupled to the inlet of the generally inverted U-shaped manifold 50. This manifold has a pair of opposite-end outlets each of which is adapted for coupling to an intake end of one of the spray heads 42.

The configuration of a spray head 42 is best seen in FIGURES 4 through 8. The spray head is a hollow body having an upper portion 54 extending above the web of the channel 14 and a lower portion 56 depending beneath the web of the channel and capped at its lower end with an integral dome 58. These parts are preferably made of separate pieces of stainless steel which are welded to the web of the channel 14 surrounding an aperture of complementary size formed in the channel web. In order that the interior spray head be exposed for visual inspection as to cleanliness, the upper portion 54 has a somewhat frusto-conical configuration merging at its enlarged-diameter lower end into the upper end of the lower portion 56. For mounting a suitable coupling device the upper end of the upper portion 54 is formed with a radially outwardly extending and circumferentially extending flange 60.

Figure 2:
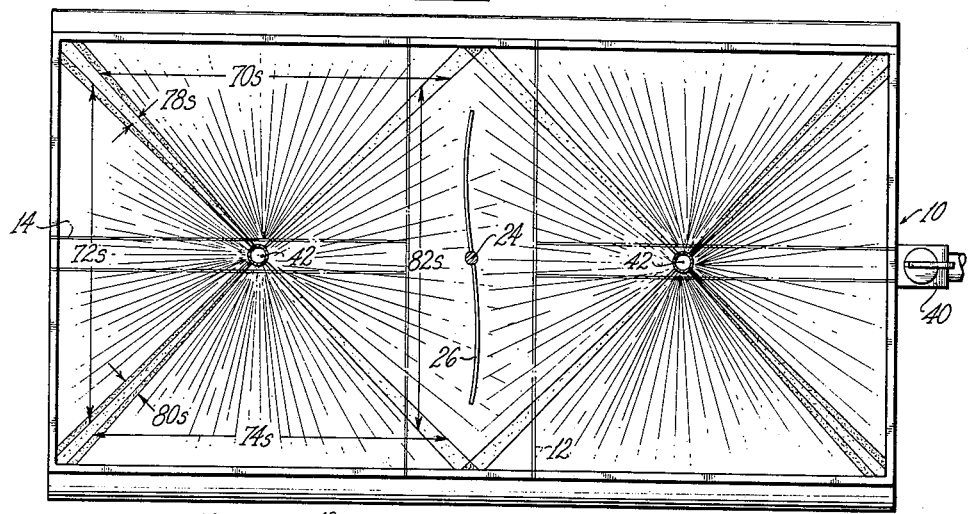
FIGURE 2 is a somewhat schematic horizontal plan view illustrating the cleaning action of my spray cleaning apparatus in a tank of the type illustrated in FIGURE 1.
Figure 3:
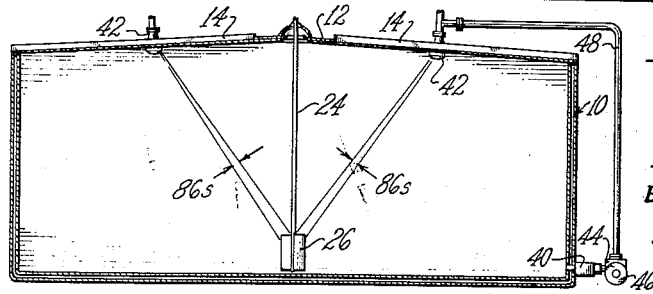
FIGURE 3 is a somewhat schematic vertical sectional view taken on substantially the longitudinal centerline of a tank illustrating another aspect of the cleaning action of the spraying apparatus.

Each spray head is adapted to provide a plurality of wide and thin streams or jets of cleaning solution, each of these streams being directed at a specific portion of the inner surface of the tank and all of which are adapted for providing a substantially unbroken film of cleaning solution over the entire area of the tank's inner walls, as well as being adapted for cleaning the agitator 26. FIGURE 2 illustrates the flow paths of the several jets or streams of cleaning solution as they emerge from the spray heads 42 to flow along the under sides of the tank doors 16 and then downwardly over the generally vertically extending walls of the tank. FIGURE 3 illustrates the action of a pair of streams of cleaning solution on the agitator 26. When the pump 44 is actuated the cleaning solution is drawn from the floor of the tank 10 through the pipe 48, manifold 50 and then through the spray head orifices to flow over all of the surfaces inside the tank, and then to be recycled through the valved outlet 40 by the pump 44.

Each spray head 42 in its lower portion 56 is formed with two arrays of horizontally directed orifices, each of these arrays being vertically spaced from the other array. The lower array includes three circumferentially extending elongated slots 70, 72 and 74. Each of these slots subtends an arc substantially equivalent to the arc subtended by the surface toward which the particular slot is directed. Thus, the slot 72 subtends an arc substantially equivalent to the arc subtended by one end wall of the tank 10. Similarly, each of the slots 70 and 74 subtends an arc substantially equivalent to the arc subtended by one-half of the length of the tank 10. The resulting streams of cleaning solution are shown in FIGURE 2, wherein the streams 70s, 72s and 74s correspond to the slots 70, 72 and 74, respectively. These three streams of cleaning solution impinge on and flow across the under sides of the doors 16 and channels 14 to the side and end walls of the tank and then flow downwardly over these walls.

The other array of slots includes a pair of relatively short slots 78 and 80 and another elongated slot 82.

Each of the short slots 78 and 80 is directed towards a corner of the tank 10 and arranged for overlapping the streams 72s and 70s so that entirely complete coverage of a substantially uniform film of cleaning solution is directed on all of the inner area of the tank.

The elongated slot 82 is directed towards the center of the tank and directly confronts the stream of cleaning solution delivered by the elongated slot 82 of the other spray head 42. As is shown in FIGURE 5, the opposite ends of the slot 82 overlap ends of the slots 70 and 74. Each slot 82 thus delivers a stream 82s overlapping one side of the stream 70s and one side of the stream 74s. Referring to FIGURE 2, it will also be noted that the short slots 78 and 80 deliver streams 78s and 80s, respectively, each of these relatively narrow streams being directed into one corner of the tank.

The dome 58 of each spray head is formed with an elongated slot 86 directed towards the agitator 26. As is shown in FIGURE 3, the agitator is thus exposed to streams of cleaning solution 86s impinging on opposite sides of the agitator 26.

In order to drain all cleaning solution from within each spray head 42 after the cleaning process has been completed, the dome 58 is centrally formed with a small bore 90.

Particular attention is called to the configuration of the slots 78, 80 and 86. Each of these slots has a length along the outer surface of the spray head 42 which substantially exceeds the length of the slot along the inner surface of the spray head 42 (see FIGURE 8). The widened exit ends of the slots 78, 80 and 86 provide a wide and thin stream of cleaning solution which is highly directional in its core and at the same time fans out broadly immediately upon exiting from the slot. Thus, each of the sprays 78s and 80s is directional enough to ensure adequate penetration of the corners of the tank by the cleaning solution. At the same time the cleaning solution exiting from these slots immediately widens to ensure an overlapping of the adjacent streams 70s, 72s and 74s immediately upon exiting of all of these streams from the spray head 42. The spray 86s fans out broadly to cover agitator 26 from end to end.

In operation, after the tank 10 has been emptied of milk the pump 44 has its intake connected to the valved outlet 40 and the pipe 48 is connected to the outlet of the pump. The pipe 48, in turn, is connected to the manifold 50 whose pair of outlets are then coupled to the intakes of the spray heads 42. One of the doors 16 of the tank 10 is then opened and a suitable quantity of cleaning solution is introduced into the tank.

The valved outlet 40 is then opened and the motor 46 energized. The cleaning solution is immediately drawn from the tank 10 at a pressure of approximately 15–20 pounds and delivered to both spray heads 42. In the spray heads the solution is divided into the several wide and thin streams previously described to impinge on the under sides of the doors 16 and subsequently to flow gravitationally downwardly across the vertically extending walls of the tank to collect on the floor of the tank, thence to be recirculated. After a suitable period of recirculation of the cleaning solution the motor 46 is de-energized. Any cleaning solution which is caught in the domed ends 58 of the spray heads 42 drains out through the bores 90. After disassembly of the manifold 50 and pipe 48 the cleaning solution collected on the floor of the tank 10 is then withdrawn through the valved outlet 40. The tank is then clean and ready for immediate reuse.

Although I have illustrated and described but one embodiment of my invention herein, it will be understood that I do not mean to be limited to the details of construction and method of operation set forth above, but only by the spirit and scope of the appended claims.

I claim:

1. In a milk tank, the improvement comprising: a spray head stationarily mounted within an uppermost portion of said tank and formed with a plurality of substantially horizontally directed and horizontally elongated orifices arranged for delivering overlapping wide and thin streams of a cleaning solution onto interior surfaces of said tank immediately adjacent said spray head to form a circulating film of cleaning solution on said surfaces; an outlet opening in said tank adapted for draining cleaning solution collecting on the floor of said tank; and a recirculatory means operatively associated with said outlet opening and with an inlet opening formed in said spray head for withdrawing cleaning solution from said outlet opening to forcefully introduce said solution at a substantially uniform pressure into said spray head and out of said orifices.

2. In a milk tank the improvement comprising: a hollow rigid body, defining a spray head, mounted within the uppermost portion of said tank and formed with a plurality of substantially horizontally elongated and directed orifices adapted for impinging a cleaning solution onto an adjacent generally horizontally disposed interior surface of said tank, at least some of said orifices being vertically offset from others of said orifices and said orifices in the aggregate having a substantially horizontally extending opening area exceeding 360 degrees whereby said cleaning solution is impinged, in the form of a plurality of overlapping streams, on substantially all of the generally horizontally disposed interior surface of said tank immediately surrounding said spray head, said tank having generally vertically disposed walls extending upwardly from a floor of said tank to receive the overlapped streams of said cleaning solution whereby said vertically disposed walls are covered by a substantially uniform continuous film of cleaning solution running gravitationally downwardly thereover; an outlet opening in said tank adapted for draining cleaning solution collected on the floor of said tank; and a recirculatory means operatively associated with said outlet opening and with an inlet opening formed in said spray head and adapted and arranged for withdrawing cleaning solution from said outlet opening to forcefully introduce said solution into said spray head and out of said orifices at a substantially constant pressure.

3. In a milk tank the improvement comprising: the hollow rigid body, defining a spray head, mounted within the uppermost portion of said tank and formed with a plurality of substantially horizontally directed orifices, each of said orifices consisting of a horizontally elongated narrow slot extending in a generally horizontal plane for a portion of the circumference of said spray head to deliver a wide and thin stream of cleaning solution, at least one of said slots being vertically offset from others of said slots and having opposite ends overlapping an end of adjacent slots, all of said slots in the aggregate having an opening area extending circumferentially around said spray head of at least 360 degrees whereby said cleaning solution is delivered, in the form of overlapping streams, on substantially all of an adjacent, generally horizontally disposed interior surface of said tank immediately surrounding said spray head, said tank having generally vertically disposed walls extending upwardly from a floor of said tank to receive the overlapped streams of said cleaning solution whereby said vertically disposed walls are covered by a substantially uniform continuous film of cleaning solution running gravitationally downwardly thereover; an outlet opening in said tank adapted for draining cleaning solution collected on the floor of said tank; and a recirculatory means operatively associated with said outlet opening and with an inlet opening formed in said spray head and adapted and arranged for withdrawing cleaning solution from said outlet opening to forcefully introduce said solution into said spray head for delivery through said orifices with sufficient force to impel said streams of cleaning solution onto vertically extending walls of said tank.

4. In a milk tank the improvement comprising: a hollow rigid body, defining a spray head, mounted within the uppermost portion of said tank and formed with a plurality of orifices adapted for delivering a cleaning solution onto an interior downwardly facing surface of said tank immediately surrounding said spray head on which surface said spray head is mounted, each of said orifices consisting of a horizontally elongated narrow slot extending around said spray head for a portion of the circumference of said spray head, a first array of said slots being each directed towards one only of several generally vertically extending surfaces of said tank and located in positions vertically offset from a second array of others of said slots, said other slots having opposite ends overlapping an end of each of a pair of slots of said first array whereby streams of cleaning solution delivered onto said downwardly facing surface by the slots of said first array overlap the streams of cleaning solution delivered onto said downwardly facing surface by the slots of said second array and a substantially continuous unbroken film of solution is delivered to upper edges of said vertically extending interior surfaces of said tank; an outlet opening in said tank adapted for draining cleaning solution collected on the floor of said tank; and a recirculatory means operatively associated with said outlet opening and with an inlet opening formed in said spray head and adapted and arranged for withdrawing cleaning solution from said outlet opening to forcefully introduce said solution into said spray head for delivery through said orifices.

5. In a tank having a centrally disposed agitator therein on the lower end of a vertically extending shaft that is journaled in a top portion of said tank, the improvement comprising: a pair of spray heads mounted on said top portion of said tank each of which is positioned within the area of one half of the top portion between said shaft and an end wall of said tank, each of said spray heads having a lower portion projecting downwardly within said tank and formed with a plurality of generally horizontally directed orifices adapted for delivering streams of a cleaning solution onto generally horizontally disposed top portions of said tank immediately surrounding said spray heads from which said solution can flow outwardly and thence downwardly over vertically extending interior surfaces of said tank, at least some of said orifices being vertically offset from others of said orifices and said orifices in the aggregate having a substantially horizontally extending opening area of substantially 360 degrees whereby said cleaning solution is delivered on substantially all of the interior surface of said tank immediately surrounding said spray heads, each of said spray heads also having aperture means formed therein directed towards said agitator adapted to deliver cleaning solution onto said agitator; an outlet opening in said tank adapted for draining cleaning solution collected on the floor of said tank; and a recirculatory means operatively associated with said outlet opening and with an inlet opening formed in each of said spray heads adapted and arranged for withdrawing cleaning solution from said outlet opening to forcefully introduce said solution into said spray heads for delivery through said orifices and through said aperture means.

6. A tank as set forth in claim 5 in which said aperture means of each spray head comprises an elongated slot formed in a domed lower end of said spray head and directed downwardly and centrally of said tank and adapted for delivering a wide and thin stream of cleaning solution onto said agitator.

7. In a tank having a centrally disposed agitator therein on the lower end of a vertically extending shaft that is journaled in a top portion of said tank, the improvement comprising: a pair of spray heads mounted on said top portion of said tank each of which is substantially centrally positioned in the center of one half of the top portion between said shaft and an end wall of said tank, each of said spray heads having a lower portion projecting downwardly within said tank and formed with a plurality of generally horizontally directed orifices adapted for delivering streams of a cleaning solution onto generally horizontally disposed top portions of said tank immediately surrounding said spray heads from which said solution can flow outwardly and thence downwardly over vertically extending interior surfaces of said tank, each of said orifices consisting of an elongated narrow slot extending around said spray head for a portion of the circumference of said spray head, a first array of said slots being directed towards one only of several generally vertically extending surfaces of said tank and located in positions vertically offset from a second array of others of said slots, said other slots having opposite ends overlapping an end of each of a pair of slots of said first array whereby streams of cleaning solution delivered by the slots of said first array overlap the streams of cleaning solution delivered by the slots of said second array and a substantially continuous unbroken film of solution is delivered to interior surfaces of said tank, said pair of spray heads having a pair of opposed slots adapted to deliver a wide and thin stream of cleaning solution towards the center of the top portion of said tank, each of said spray heads also having an elongated slot formed in a domed lower end thereof and directed downwardly and centrally of said tank that is adapted for delivering a wide and thin stream of cleaning solution onto said agitator; an outlet opening in said tank adapted for draining cleaning solution collected on the floor of said tank; and a recirculatory means operatively associated with said outlet opening and with an inlet opening formed in said spray head and adapted and arranged for withdrawing cleaning solution from said outlet opening to forcefully introduce said solution into said spray heads and out of said orifices.

8. In a tank having a longitudinally extending interior wall of generally upwardly concave configuration defining the floor and opposite side walls of said tank, a pair of vertically extending opposite-end interior walls at opposite ends of said longitudinally extending wall, a plurality of doors in the top portion of said tank that when closed slope outwardly and downwardly to engage the upper ends of said walls, and a centrally disposed agitator on the lower end of a vertically extending shaft that is journaled in the top portion of said tank, the improvement comprising: a pair of spray heads mounted within the uppermost regions of said tank, each of said spray heads being centrally positioned in one half the top portion of said tank between said shaft and one end wall, each of said spray heads being formed with two vertically offset arrays of circumferentially extending elongated narrow slots all of which are adapted for delivering streams of a cleaning solution onto the interior surfaces of said door and top portion of said tank immediately surrounding said spray head whereby said solution can flow thereacross and thence downwardly across the walls of said tank to collect on the floor of said tank, the first of said arrays having three slots within a common substantially horizontal plane one of which is directed towards one end wall and a pair of which are oppositely directed towards opposite side walls, said one slot subtending an arc substantially the same as the arc subtended by said end wall and each of said pair of slots subtending an arc substantially the same as the arc subtended by the one-half of the length of a side wall in the one-half of the tank in which said spray head is positioned, the second of said arrays having three slots within a common substantially horizontal plane one of which is directed towards the center of said tank and subtends an arc overlapping the arcs subtended by said opposite pair of slots of said first array, the other slots of said second array each being directed towards a corner of said tank and subtending an arc overlapping the arcs subtended by said one slot and one of said opposite slots of said first array, each of said spray heads also having an elongated slot formed in a domed lower end thereof directed downwardly and centrally of said tank adapted for delivering a wide and thin stream of cleaning solution onto said agitator; a valve outlet opening in one end wall of said tank adapted for draining cleaning solution collected on the floor of said tank; a pump means having an intake connected to said outlet; and a pipe means connected to the outlet of said pump means and including a manifold adapted to distribute cleaning solution to both said spray heads.

9. In a tank the improvement comprising: a pair of spray heads each of which is substantially centrally positioned within the area of one end-half of a top portion of said tank, each of said spray heads having a lower portion projecting downwardly within said tank and formed with a plurality of generally horizontally elongated and directed orifices adapted for delivering streams of a cleaning solution onto generally horizontally disposed top portions of said tank immediately surrounding said spray heads from which top portions said solution can flow outwardly and thence downwardly over vertically extending interior surfaces of said tank, at least some of said orifices being vertically offset from others of said orifices and said orifices in the aggregate having a substantially horizontally extending opening area of substantially 360° whereby said cleaning solution is delivered on substantially all of the interior surface of said tank immediately surrounding each of said spray heads; an outlet opening in said tank adapted for draining cleaning solution collected on the floor of said tank; and a recirculatory means operatively associated wtih said outlet opening and with an inlet opening formed in each of said spray heads and adapted and arranged for withdrawing cleaning solution from said outlet opening to forcefully introduce said solution into said spray heads for delivery through said orifices.

References Cited in the file of this patent

UNITED STATES PATENTS

| | | |
|---|---|---|
| 909,654 | Oliver | Jan. 12, 1909 |
| 1,628,141 | Gray | May 10, 1927 |
| 1,806,740 | Butterworth | May 26, 1931 |
| 2,057,874 | Barks | Oct. 20, 1936 |
| 2,552,852 | Idle | May 15, 1951 |
| 2,748,036 | Deitrickson | May 29, 1956 |
| 3,001,533 | Holdren | Sept. 26, 1961 |